United States Patent
Meissner et al.

(10) Patent No.: US 7,703,282 B1
(45) Date of Patent: Apr. 27, 2010

(54) HEAT EXCHANGER WITH HORIZONTAL FLOWING CHARGE AIR COOLER

(75) Inventors: Alan Paul Meissner, Franklin, WI (US); Randall Lee Chartrand, Gordon, WI (US)

(73) Assignee: IEA, Inc., Kenosha, WI (US)

( * ) Notice: Subject to any disclaimer, the term of this patent is extended or adjusted under 35 U.S.C. 154(b) by 182 days.

(21) Appl. No.: 12/001,215

(22) Filed: Dec. 10, 2007

(51) Int. Cl.
*F02B 29/04* (2006.01)
*F02B 33/44* (2006.01)
*B60H 1/00* (2006.01)
*F28F 9/26* (2006.01)

(52) U.S. Cl. .............................. 60/599; 60/612; 165/41; 165/51; 165/144

(58) Field of Classification Search .................. 60/599, 60/612; 165/41, 51, 140, 144
See application file for complete search history.

(56) References Cited

U.S. PATENT DOCUMENTS

| | | | | |
|---|---|---|---|---|
| 4,273,082 A | * | 6/1981 | Tholen | 60/599 |
| 4,559,994 A | * | 12/1985 | Waldmann et al. | 165/41 |
| 6,935,307 B2 | * | 8/2005 | Watanabe et al. | 60/599 |
| 2006/0021347 A1 | * | 2/2006 | Sun et al. | 60/612 |
| 2006/0289143 A1 | * | 12/2006 | Tallon | 165/41 |
| 2007/0125527 A1 | * | 6/2007 | Flik et al. | 165/140 |
| 2008/0168770 A1 | * | 7/2008 | Mokire et al. | 60/599 |

* cited by examiner

*Primary Examiner*—Thomas E Denion
*Assistant Examiner*—Mary A Davis
(74) *Attorney, Agent, or Firm*—Brannen Law Office, LLC

(57) ABSTRACT

The heat exchanger of the present invention has a charge air cooler stacked upstream of a jacket water cooler. The charge air cooler is split into two sections. Each section has a vertical tank and header on the outside of the charge air cooler. Charge air enters the respective tanks and then horizontally flows to a vertical center tank, where it flows vertically to the outlet, and is routed to the engine. Maximum entering temperature differentials in the charge air cooler occurs at the sides of the cooler, as does maximum heat energy transfer. The air passing through the middle of the charge air cooler (adjacent the vertical center tank) gains the least amount of heat energy. The jacket water cooler can be a vertical flow cooler. A significant portion of the jacket water cooler at the middle of the jacket water cooler operates at increased entering temperature differential.

18 Claims, 11 Drawing Sheets

HEAT EXCHANGER WITH HORIZONTAL FLOWING CHARGE AIR COOLER

BACKGROUND OF THE INVENTION

1. Field of the Invention

The present invention relates to a heat exchanger, and particularly to a series or stacked heat exchanger with a horizontally flowing charge air cooler and a vertically flowing jacket water cooler.

2. Description of the Related Art

It is well known that heat energy contained in one fluid is capable of being transferred to another fluid. Such heat transfer is described in the classical heat transfer equation: Q=UAdT. In this equation, Q represents the heat transfer, U represents a coefficient of heat transfer, A represents the surface area through which the heat can be transferred, and dT represents the change in temperatures between the two mediums. Heat exchangers, and radiators in particular, are designed for a relative high level of transfer of heat energy from one medium to another. One common example is an automobile radiator, in which a coolant fluid passes through an engine to absorb heat energy from the engine. The coolant fluid then is routed through the radiator, where heat is transferred from the coolant fluid to the environment (ambient air).

Engineers and designers have incorporated many strategies to increase the amount of heat that a heat exchanger is capable of transferring. One strategy is to attempt to increase the coefficient of heat transfer. Design components, such as the incorporation of louvers, dimples, waves, ridges and other alterations to the fin and tube profiles have been effectively used. While these improvements are quantifiable and generally useful, there are limitations (both practical and theoretical) as to how much the coefficient of heat transfer can be improved. For example, the increased capital investment in equipment and tooling costs may overshadow any savings associated with the increased coefficient. Accordingly, it may take a long time to recapture those costs through efficiency savings, if it is even possible at all.

Others have had success in increasing the heat transferring capability of the heat exchanger by increasing the surface area between the two mediums (i.e. increasing the size of the heat exchanger). The increases in surface area can come from a combination of increases in height, width, depth and density of the heat exchanger. Often times, the size requirements for shipping, packaging and deliverable use dictate maximum dimensions in the height and width dimensions. In such situations, the only remaining variable is the depth of the unit. Accordingly, designers have increased the depth of the heat exchanger in order to increase the surface area.

Some heat exchangers are designed for use with engines having turbochargers. It is standard practice to stack two or more radiators in series to cool both a jacket water coolant from the engine and charge air compressed by one or more turbochargers. The traditional configuration has a charge air cooler first, and a jacket water cooler second. Put another way, the charge air cooler is upstream of the jacket water cooler in some configurations, such that air first passes through the charge air cooler and second through the jacket water cooler. There are several drawbacks associated with the standard configuration.

It is well known that the maximum heat transfer in a charge air cooler occurs at the inlet side of the cooler where a maximum entering temperature differential exists between the fluids exchanging heat energy. The heat transfer decreases as the charge air passes through the cooler, as the temperature difference between the ambient air and the charge air decreases. The result is that the air (having passed through the charge air cooler) has an uneven temperature distribution as it passes through the jacket water cooler (the second cooler).

In a configuration where the charge air cooler has charge air moving up vertically through the cooler, the effective area of the jacket water cooler can decrease. This is because the air that passes through the charge air cooler near the inlet realizes the largest heat rise. The air with the largest heat rise can have a temperature that approaches or even surpasses the engine coolant temperature in the jacket water cooler. With little or no temperature differential in those areas of the jacket water cooler, no cooling takes place. The jacket water cooler can therefore operate at less than desired efficiency. To compensate for and overcome this inefficiency, air movers with increased horsepower capacity are utilized to move additional air through the heat exchanger. Yet, this approach can prove ineffective where little or no temperature differential exists. The standard configuration is therefore designed to be less than fully efficient.

A considerable amount of pressure, caused by the expansion of the air as it gains energy from the heat exchanger, can develop near the inlet sides of the coolers. This pressure gain can negatively affect the flow characteristics of the air passing through the coolers. The fan therefore needs to have greater horsepower capacity (i.e. higher initial cost plus increased energy consumption during operation) in order to move the intended amount of air through the heat exchanger at the desired locations to overcome the increase in external system pressure.

A further issue facing charge air coolers is the potential for axial thermal expansion of the tubes within the charge air cooler, which leads to local stress and high vibrations risk because of the different growth characteristics of the components of the heat exchanger.

A still further potential drawback associated with standard charge air coolers is that the inlet tube and header interfaces are subject to a great deal of stress. The weight of the charge air and the vibrations can exacerbate the stress at the joints.

Thus there exists a need for a heat exchanger that solves these and other problems.

SUMMARY OF THE INVENTION

The present invention is directed toward overcoming one or more of the disadvantages set forth above. The present invention relates to a heat exchanger, and particularly to a stacked heat exchanger with a horizontally flowing charge air cooler and a vertically flowing jacket water cooler.

According to one embodiment of the present invention, a heat exchanger is provided for dissipating heat from a turbocharged engine. The heat exchanger has a charge air cooler stacked upstream of a jacket water cooler. The charge air cooler is split into two sections, a first section and a second section. Each section has a vertical tank and header on the outside of the charge air cooler. Charge air enters the headers and then horizontally flows to a vertical center tank. The charge air flows vertically in the vertical center tank to the outlet, and is routed to the engine. Maximum entering temperature differential in the charge air cooler occurs at the sides of the cooler, as does maximum heat energy transfer. The air passing through the middle of the charge air cooler (adjacent the vertical center tank) gains the least amount of heat energy as the entering temperature differential is the smallest. The jacket water cooler can be a vertical flow cooler. The effective surface area of the jacket water cooler operating at an advantageous entering temperature differential (because of less heat energy absorbed as the air passes through the middle of the charge air cooler) is increased, thereby increasing the effectiveness of the jacket water cooler.

According to one advantage of the present invention, the charge air cooler has an increased area utilizing maximum entering temperature differential. This is accomplished through the use of a first header at the first side of the charge air cooler and a second header at the other side of the charge air cooler. Increasing the area subject to maximum entering temperature differentials increases the efficiency of the charge air cooler.

According to another advantage of the present invention, the entering temperature differential in the jacket water cooler is increased for a significant portion of the jacket water cooler surface area. This is accomplished because the air passing through the charge air cooler is warmest near the sides of the jacket water cooler and is cooler near the center. With two zones in the charge air cooler operating at maximum entering temperature differential, this leaves a wide area of air that can pass through the jacket water cooler that is relatively cool to provide increased entering temperature differential.

According to a further advantage of this layout of the present invention, there is reduced pressure drop of the charge air inside of the charge air cooler. This is accomplished as the horizontal tubes within each side of the charge air cooler span from the headers on the side to the center tank. The shorter the tubes, the less the internal pressure drop. Related, the charge air cooler of the present invention is subject to less axial thermal growth as the length of the tubes is decreased.

According to a still further advantage of the present invention, there is reduced pressure drop between the turbochargers and the charge air cooler, and between the charge air coolers and the engine (external of the charge air cooler). This is accomplished by having direct piping from the turbochargers to the sides of the charge air cooler without complex manifolding.

According to a still further advantage yet of the present invention, the center trapping tank aids in increasing combustion performance in the engine by removing moisture from the charge air. This is advantageously accomplished by having the center tank be vertical. It is understood that as the charge air cools, it can hold less moisture. Any condensate is trapped by the center tank and can fall under the force of gravity harmlessly to the bottom of the tank instead of being piped into the engine. It is appreciated that condensate can also be trapped in the vertical side tanks of the charge air cooler.

According to a still further advantage yet of the present invention, there is reduced stress at the interface between the tubes and the headers of the charge air cooler. This is partly accomplished by utilizing two headers, thereby reducing the volume of charge air passing through the each header. Further, the horizontal flow through the charge air cooler acts to reduce the weight at each tube and header interface. Still further, axial thermal expansion of the tubes is reduced within the tubes, thereby reducing stress and vibrations at the headers.

According to a still further advantage yet of the present invention, there is a more uniform backside pressure profile. This is accomplished in the overall layout of the present invention by utilizing more area of maximum entering temperature differential in the charge air cooler and increasing the entering temperature differential in a significant portion of the jacket water cooler. The more uniform backside pressure differential lowers the overall system resistance and pressure gain. This decreases parasitic energy loss via the fan or other components, and increases the efficiency of the heat exchanger. Accordingly, a fan with relatively less horsepower is required to move the necessary amount of air through the heat exchanger.

Other advantages, benefits, and features of the present invention will become apparent to those skilled in the art upon reading the detailed description of the invention and studying the drawings.

DETAILED DESCRIPTION OF THE PREFERRED EMBODIMENTS

Figure 1:
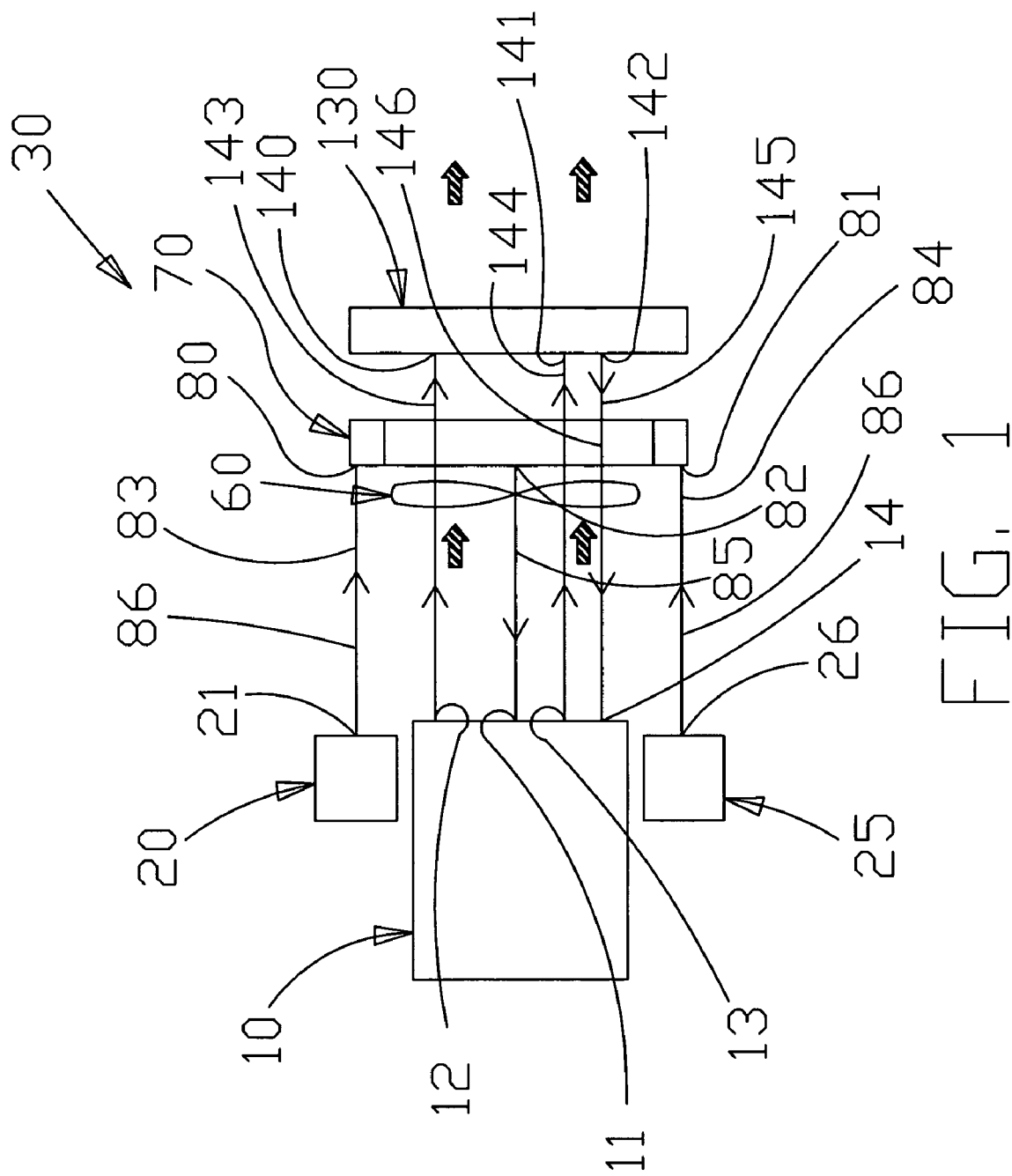
FIG. 1 is a schematic top view showing the independent cooling circuits of the heat exchanger of the present invention.

While the invention will be described in connection with several preferred embodiments, it will be understood that it is not intended to limit the invention to those embodiments. On the contrary, it is intended to cover all alternatives, modifications and equivalents as may be included within the spirit and scope of the invention as defined by the appended claims.

The present invention is intended for use with an engine 10 designed for use with several turbochargers shown schematically as 20 and 25. The engine 10 can have a coolant inlet 14, and two coolant outlets 12 and 13, respectively. Coolant passes from the coolant outlets 12 and 13 and is piped to a heat exchanger 30 (described below) for cooling. Cooled coolant is returned to the engine 10 through inlet 14. The engine 10 further has a charge air inlet 11. A fuel inlet is further provided according to the present invention, but is not specifically shown.

One or more turbochargers can be located on each side of the engine 10. For sake of simplicity, the illustrated preferred embodiment will be described for use with two turbochargers 20 and 25, respectively. Yet, it is understood that more turbochargers may be utilized without departing from the broad aspects of the present invention. Each turbocharger 20 and 25 comprises two chambers. The chambers house a turbine and a compressor, respectively. It is typical for a common shaft to connect the turbine blades and the compressor blades. Exhaust from the engine flowing out of exhaust enters the turbine and expands through the turbine blades. The expansion through the turbine blades cause the blades and shaft to rotate at a high rate of speed. The rotation of the shaft causes the blades in the compressor to likewise rotate. The compressor blades pull ambient air into the compressor to compress the air to relatively high temperature and pressure. Turbocharger 20 has a charge air outlet 21, and turbocharger 25 has a charge air outlet 26. Piping (described below) pipes the charge air to the heat exchanger 30 for cooling.

The heat exchanger assembly 30 (hereafter referred to as heat exchanger 30) is used to receive hot coolant from the engine 10, and return cooled coolant to the engine. The heat exchanger 30 also is used to cool hot charge air from the turbochargers 20 and 25, and return cooled charge air to the engine 10 for use in combustion process. FIG. 1 schematically shows the charge air cooling circuit 86 and the jacket water cooling circuit 146.

Figure 2:
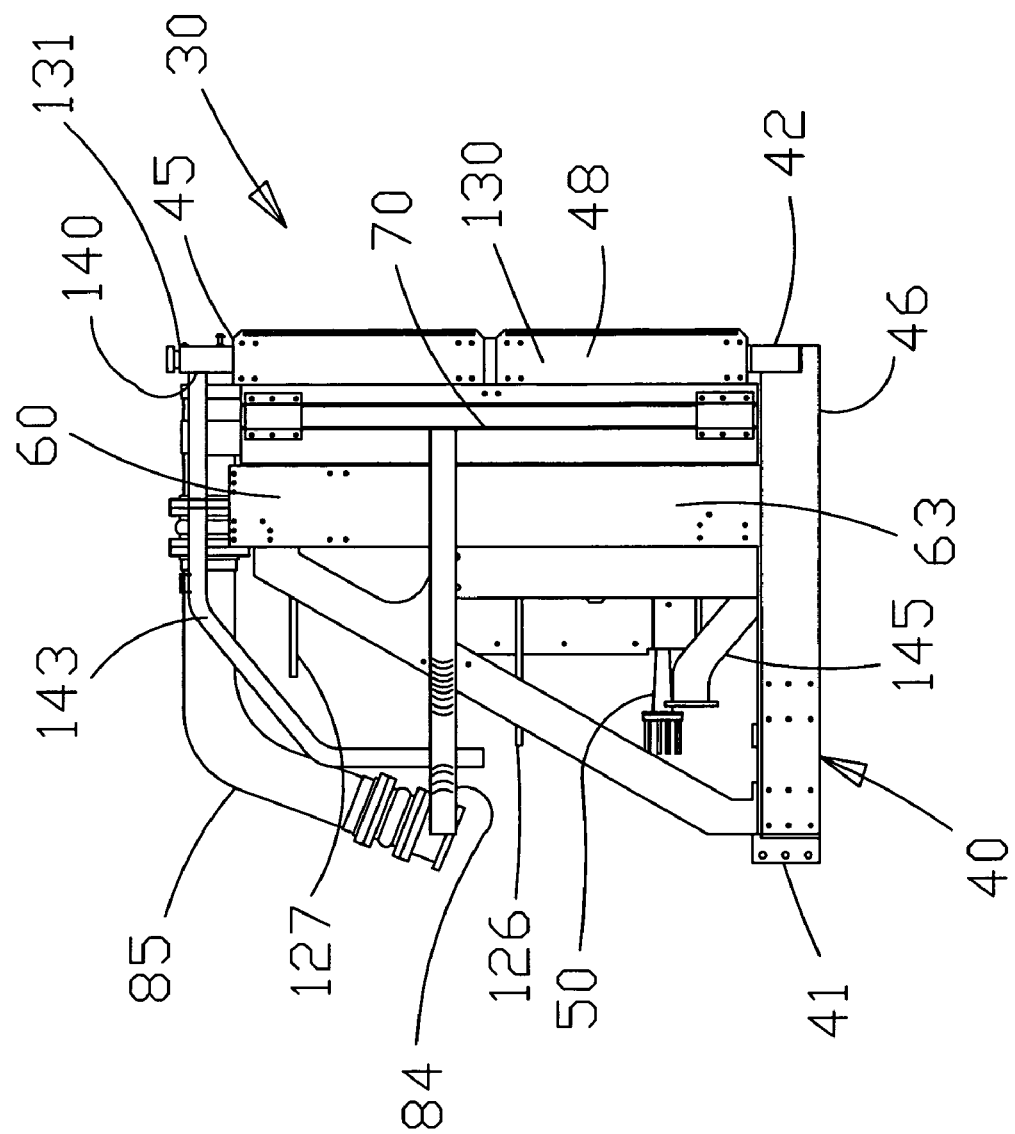
FIG. 2 is side view of a preferred embodiment of the present invention.
Figure 3:
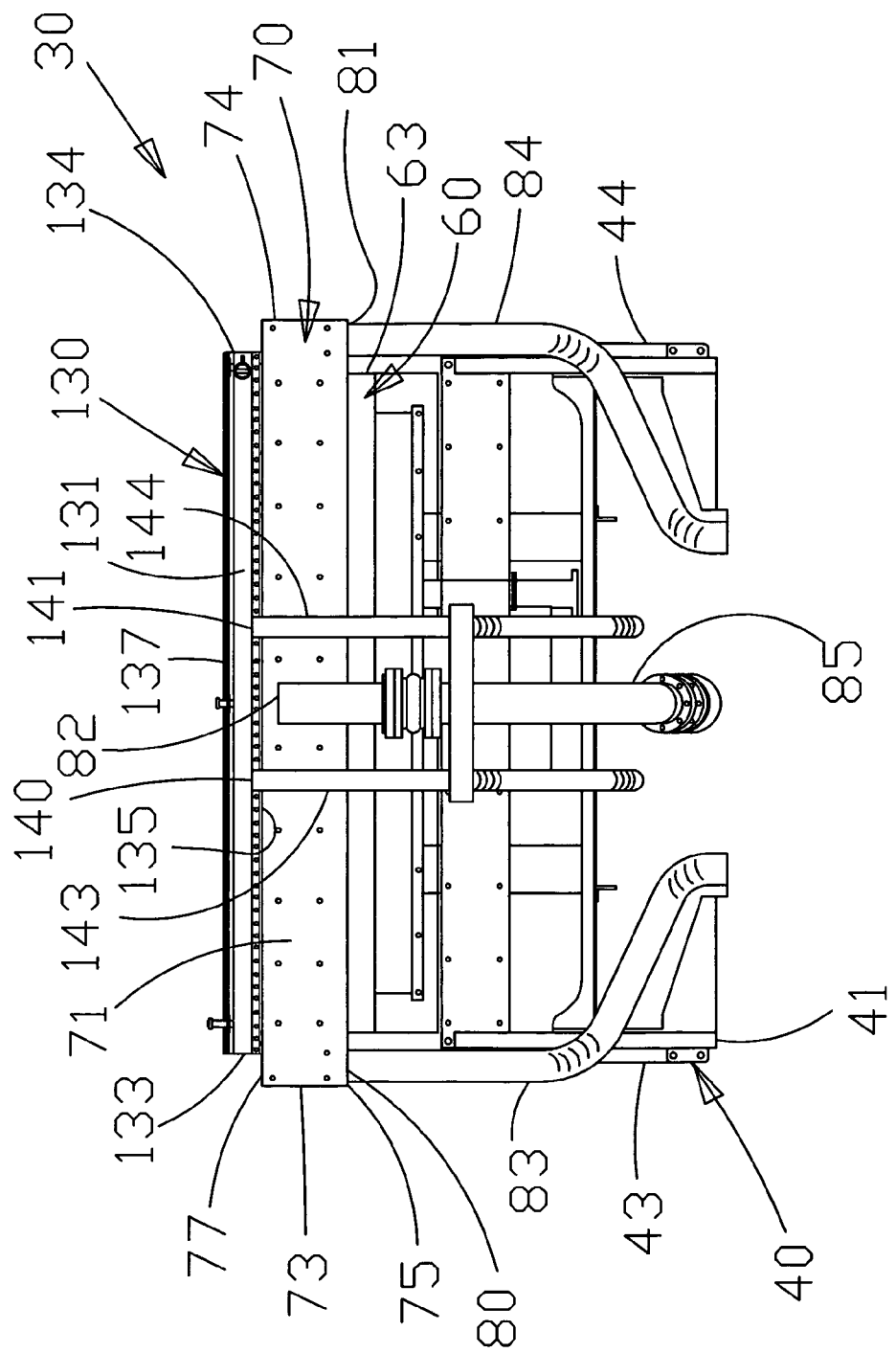
FIG. 3 is a top view of the preferred embodiment shown in FIG. 2.
Figure 4:
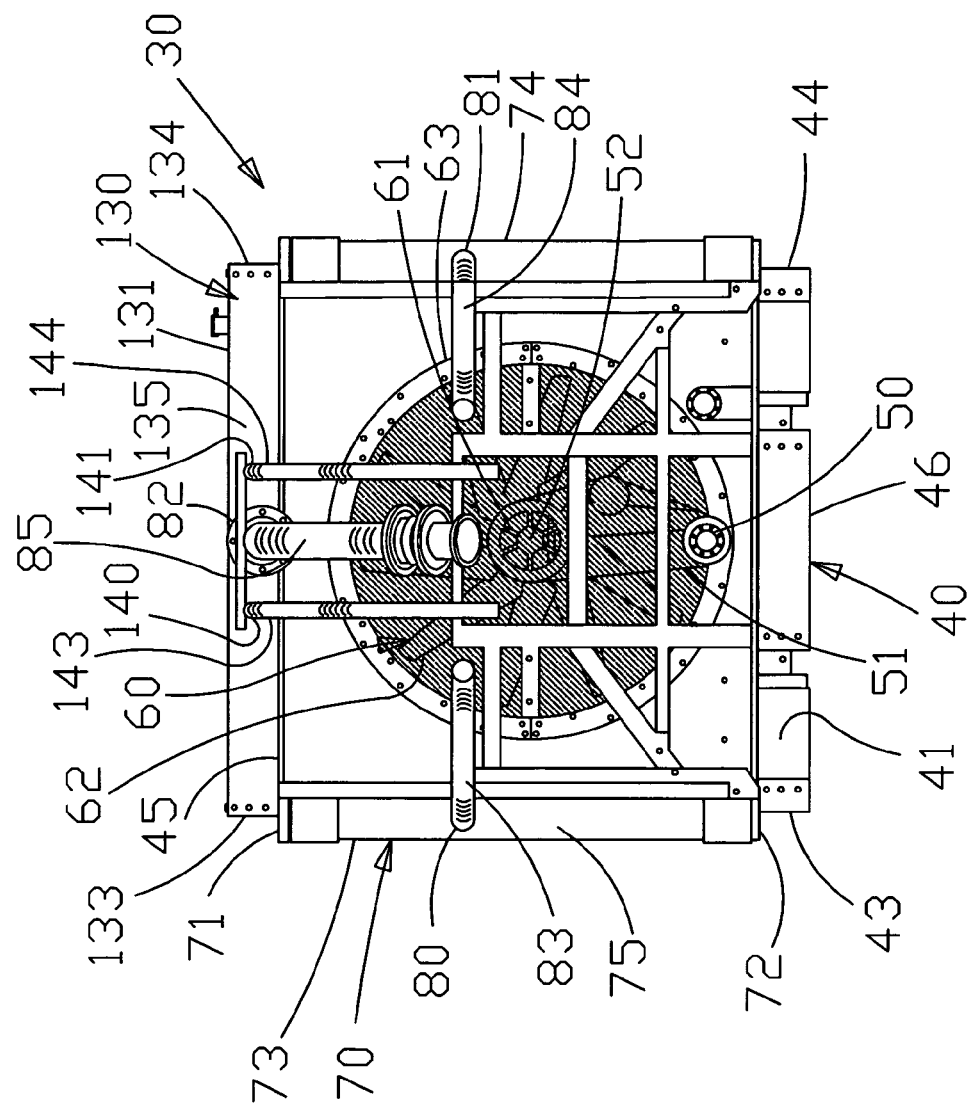
FIG. 4 is front view of the preferred embodiment shown in FIG. 2.

Looking now to FIGS. 2-4, a preferred frame 40 is illustrated. The frame 40 has a first end at the front 41 and an opposed second end at the back 42. The first end 41 is preferably located adjacent the engine 10. The second end 42 is preferably located remote from the engine 10. The frame 40 further has sides 43 and 44, and a top 45 and a bottom 46.

A stub shaft 50 is provided according to the present invention. The stub shaft 50 couples with an engine drive shaft (not shown) connected to the engine 10. The engine drive shaft typically has a low clearance above the ground, and the stub shaft 50 likewise is relatively close to the ground. A link, such as a belt 51, can be around the stub shaft 50, such that rotation of the stub shaft 50 causes the belt 51 to rotate.

Looking now particularly at FIG. 4, it is seen that a fan shaft 52 is provided. The fan shaft 52 is preferably aligned between the sides 43 and 44 of the frame 40. The fan shaft 52 is rotatably coupled with the stub shaft 50 via belt 51. In this regard, the fan shaft 52 rotates as the stub shaft 50 rotates.

An air mover is provided according to the present invention. In the preferred embodiment, the air mover is a fan 60. The fan 60 has a hub 61 that is coupled to the fan shaft 52. Several blades 62 extend radially from the hub 61, and are provided at a selected pitch. A plenum or housing 63 is provided for containing the fan blades 62. Fan 60 is shown to be a pusher fan. However, it is understood that a puller fan or any other type of mechanical air convection apparatus such as a blower could alternatively be used without departing from the broad aspects of the present invention.

Looking now to FIGS. 8-11, it is seen that a charge air cooler 70 is provided. The charge air cooler 70 dissipates heat from the charge air charged by the turbochargers 20 and 25. This cooler is preferably an air to air heat exchanger. It can be constructed of metal oval tubes and metal serpentine fins. The tubes can be aligned in a parallel horizontal pattern (described below) and can be multiple rows deeps. Air can flow into and out of the cooler 70 through aluminum nozzles. It is understood that while the description heretofore represents a preferred construction, other embodiments can be used without departing from the broad aspects of the present invention. The charge air cooler 70 has a top 71, a bottom 72, a first side 73, a second side 74 and a front 75. The front 75 of the charge air cooler 70 preferably is planar and lies in plane 76. The front 75 is upstream of a back 77.

A first charge air inlet 80 is provided. The charge air inlet 80 is preferably located at side 73 of the charge air cooler 70 and is intermediate the top 71 and the bottom 72. A second charge air inlet 81 is also provided. The charge air inlet 81 is preferably located at side 74 of the charge air cooler 70 and is intermediate the top 71 and the bottom 72. Further, a charge air outlet 82 provided. The charge air outlet 82 is preferably located at the top 71 of the charge air cooler 70, and can be equidistant between sides 73 and 74. Looking again at FIG. 1, it is seen that an inlet line 83 is provided. The inlet line 83 has a first end connected to the first turbocharger 20, and a second end connected to the charge air inlet 80 of the charge air cooler 70. Inlet line 84 is further provided. The inlet line 84 has a first end connected to the second turbocharger 25, and a second end connected to the charge air inlet 81 of the charge air cooler 70. Further, a return line 85 is further provided. The return line 85 has a first end connected to charge air inlet 14 of the engine 10, and a second end connected to the charge air outlet 82 of the charge air cooler 70. The charge air cooler 70, the inlet lines 83 and 84, and the return line 85 comprise a charge air cooling circuit 86. The charge air cooling circuit 86 is a distinct and independent internal cooling circuit.

The charge air cooler 70 is preferably located adjacent the engine 10. Accordingly, the inlet lines 83 and 84, and the return line 85 are of minimal length and a minimal number of bends. The internal pressure drop corresponding to the length in piping is therefore minimized.

Looking again at FIGS. 8-11, it is shown that the charge air cooler 70 has a first section 90, a second section 100 and a center tank 110. These three components are described in detail below.

The first section 90 comprises the portion of the charge air cooler 70 bordered by side 73, the top 71, the bottom 72 and the center tank 110. The first section 90 has a top 91, a bottom 92, a first side 93 and a second side 94. A tank 95 is located along side 93 and spans between the charge air cooler top 71 and bottom 72. A header 96 is provided and is located on the side of the tank 95 remote from side 93 of the first section 90 of the charge air cooler 70. Several tubes 97 are provided. The tubes 97 horizontally run between header 96 and the center tank 110, such that the flow of charge air is from the header 96 to the center tank 110.

The second section 100 comprises the portion of the charge air cooler 70 bordered by side 74, the top 71, the bottom 72 and the center tank 110. The second section 100 has a top 101, a bottom 102, a first side 103 and a second side 104. A tank 105 is located along side 74 and spans between the charge air cooler top 71 and bottom 72. A header 106 is provided and is located on the side of the tank 105 remote from side 104 of the second section 100 of the charge air cooler 70. Several tubes 107 are provided. The tubes 107 horizontally run between header 106 and the center tank 110, such that the flow of charge air is from the header 106 to the center tank 110.

Tanks 95 and 105 are preferably vertically oriented. Condensate can develop within these tanks 95 and 105 on the surfaces due to surfaces being cooler than the charge air. The condensate can then fall to the bottom of the respective tanks 95 and 105 and be collected.

The center tank 110 has a top 111, a bottom 112, a first side 113 and a second side 114. The first side 113 is separated from the second side 114 with an inner wall 115. The center tank 110 is a condensate trapping center tank. As the charge air is cooled in the charge air cooler 70, its ability to retain moisture is reduced. Any condensate that precipitates from the charge air is collected in the vertical tank 110 and can fall to the bottom 112 of the tank for collection. The charge air that passes from the center tank 110 to the return line 85 therefore has limited or reduced moisture content which is favorable use in the combustion process in the engine 10.

Charge air from turbocharger 20 is piped through inlet line 83 to inlet 80 entering tank 95 and accordingly into header 96. The charge air is under pressure and is evenly distributed through header 96. The charge air then passes through the horizontal tubes 97 towards the center tank 110. It is appreciated that the maximum temperature differential between the ambient air and the charge air occurs in the tubes 97 adjacent the header 96. The temperature differential between the ambient air and the charge air is reduced by the time the charge air exits the tubes 97 into the center tank 110.

Charge air from turbocharger 25 is piped through inlet line 84 to inlet 81 entering tank 105 and accordingly into header 106. The charge air is under pressure and is evenly distributed through header 106. The charge air then passes through the horizontal tubes 107 towards the center tank 110. It is appreciated that the maximum temperature differential between the ambient air and the charge air occurs in the tubes 107 adjacent the header 106. The temperature differential between the ambient air and the charge air is reduced by the time the charge air exits the tubes 107 into the center tank 110.

Accordingly, the air that passed through the middle (between sides 73 and 74) of the charge air cooler 70 is cooler, and creates a zone of air favorable to increased entering temperature differential downstream of the charge air cooler.

Figure 5:
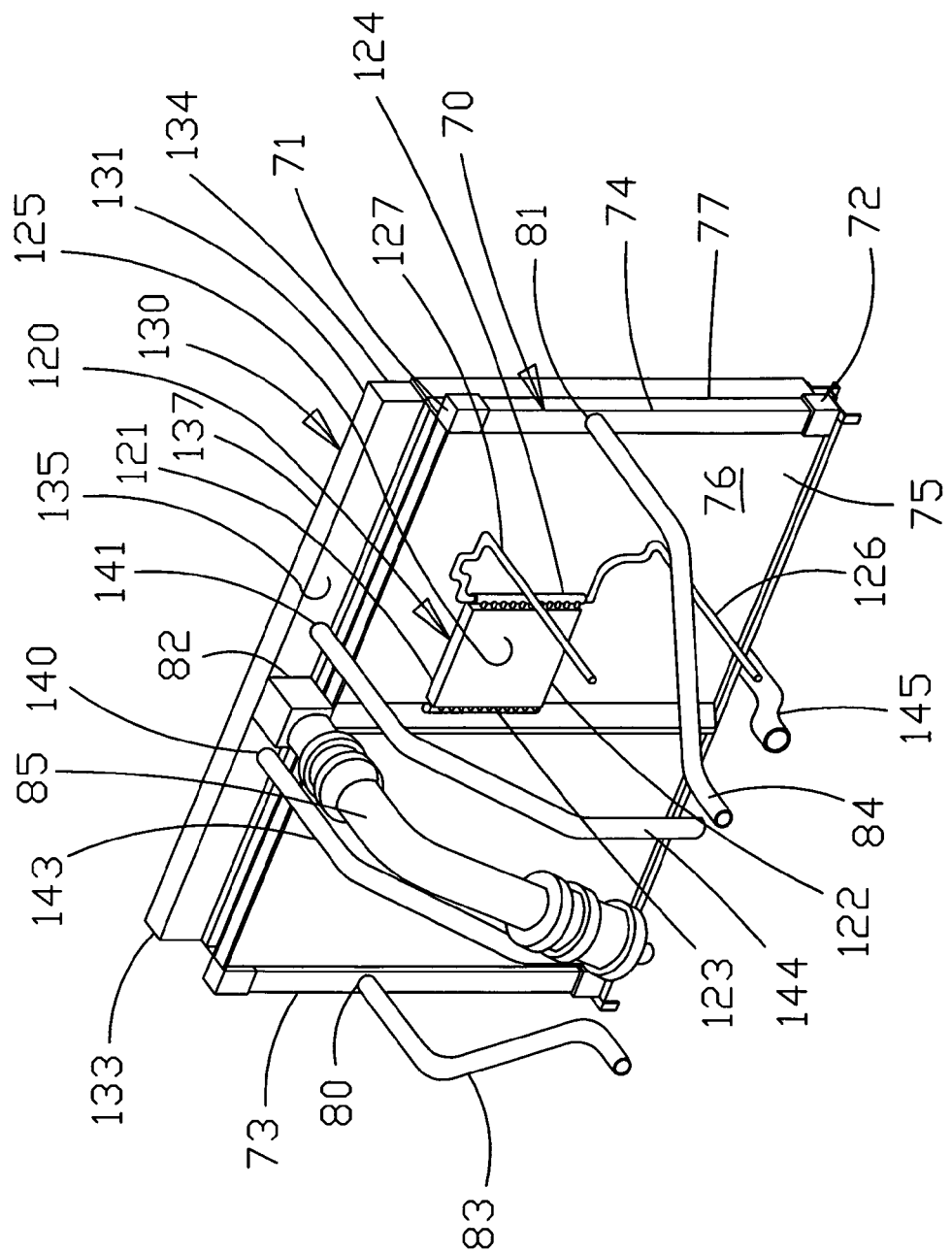
FIG. 5 is an isolated perspective view of a preferred embodiment of the charge air cooler, the jacket water cooler and the fuel oil cooler of the present invention.

A fuel oil cooler 120 is provided for dissipating heat from the excess fuel from the engine 10. The fuel oil cooler 120 is shown in FIG. 5. This cooler 120 is preferably a liquid to air heat exchanger. It can be constructed of metal round tubes and metal flat fins. Fuel can flow into and out of the cooler 120 through metal nozzles. It is understood that while the description heretofore represents preferred construction, other embodiments can be used without departing from the broad aspects of the present invention. The fuel oil cooler 120 is preferably held in place by brackets that are supported by the frame of the heat exchanger 30. The fuel oil cooler 120 has a top 121, a bottom 122, a first side 123, a second side 124 and a front 125. The front 125 of the fuel oil cooler 120 preferably is planar and lies in a plane. The front 125 is upstream of a back (not shown).

An inlet line 126 is provided. The inlet line 126 has a first end connected to the excess fuel outlet of the engine 10, and a second end connected to the fuel oil cooler inlet. An outlet or return line 127 is also provided. The outlet line 127 has a first end connected to a fuel reservoir, and a second end connected to the outlet of the fuel oil cooler 120. The fuel oil cooler 120, the inlet line 126 and the outlet line 127 comprise a fuel oil cooler circuit.

In the illustrated embodiment, the fuel oil cooler 120 is stacked upstream of and in series with the charge air cooler 70. The surface area of the front 125 of the fuel oil cooler is much smaller that the surface area of the charge air cooler 70, as shown in FIG. 5. The front 125 of the fuel oil cooler is preferably parallel to the front 75 of the charge air cooler 70.

Figure 6:
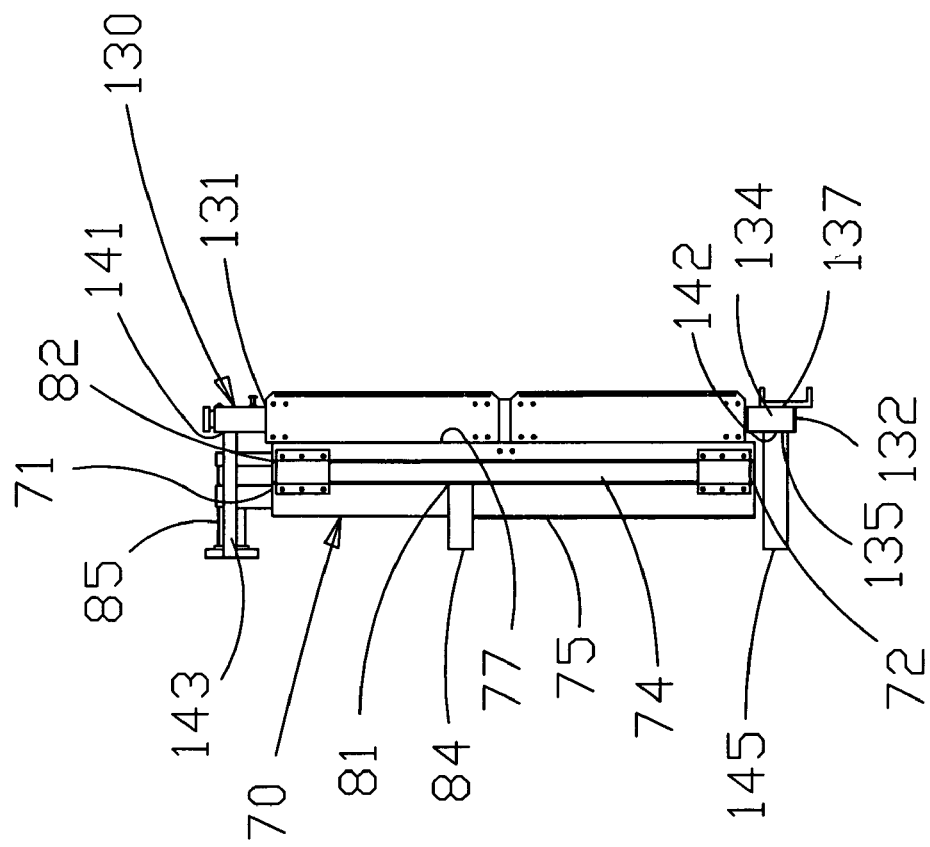
FIG. 6 is an isolated side view of a preferred charge air cooler and jacket water cooler in alignment.
Figure 7:
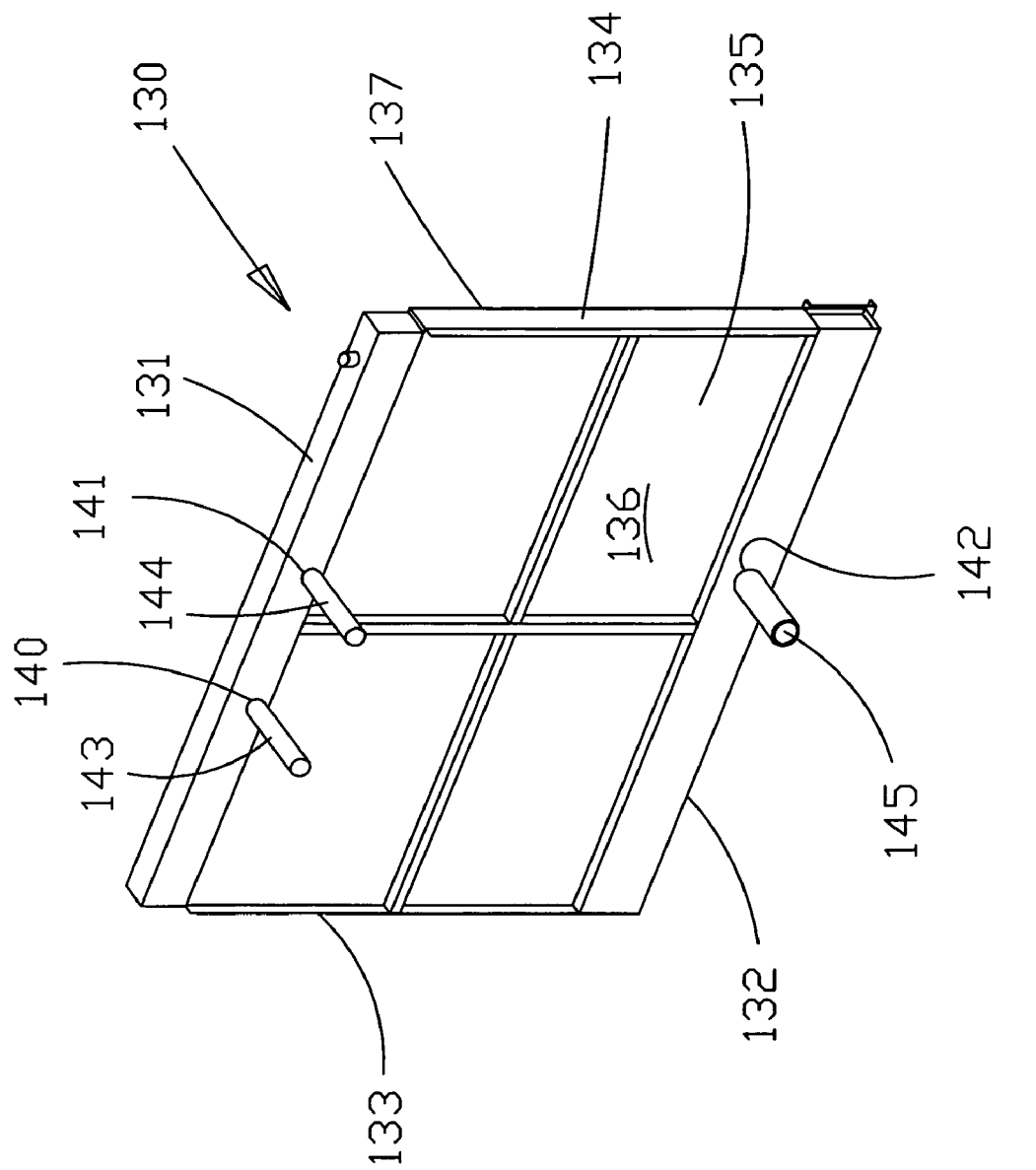
FIG. 7 is an isolated perspective view of preferred jacket water cooler.
Figure 8:
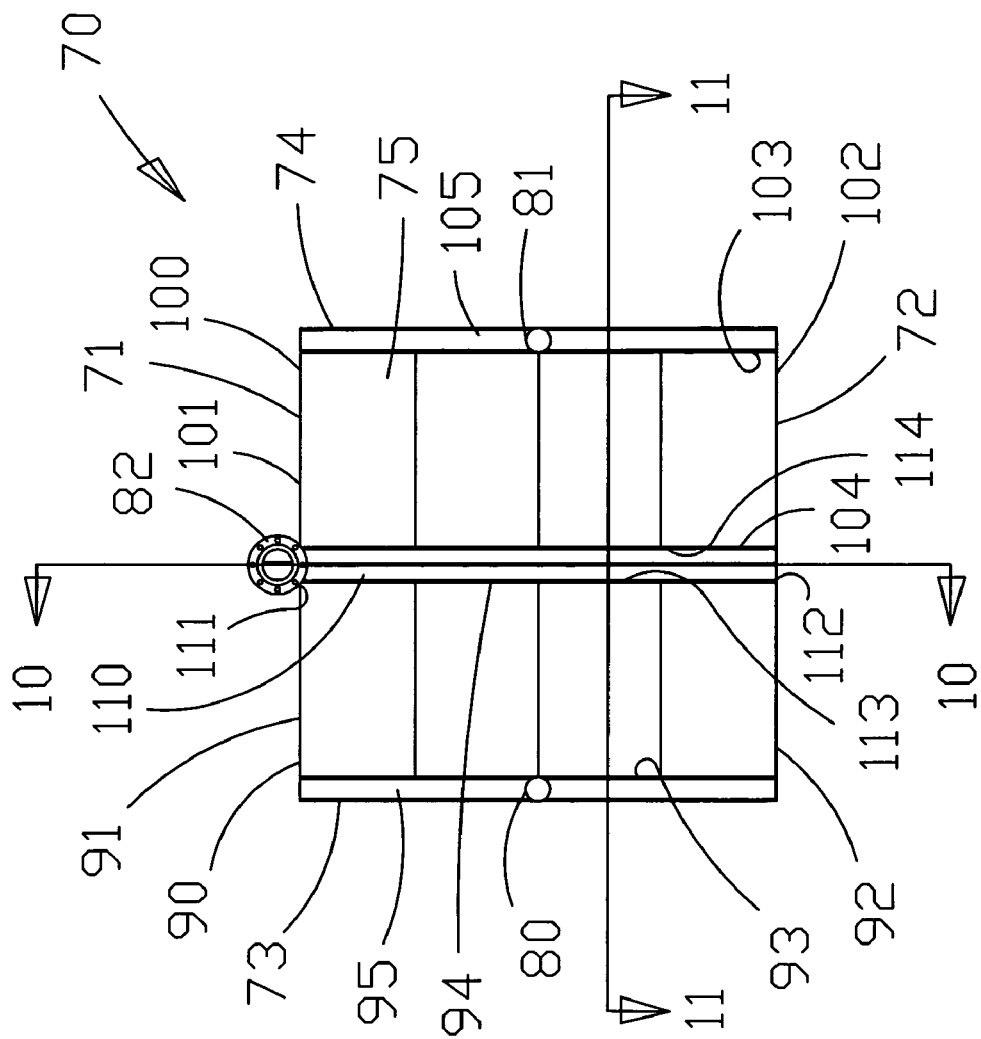
FIG. 8 is a front view of a preferred embodiment of a charge air cooler.
Figure 9:
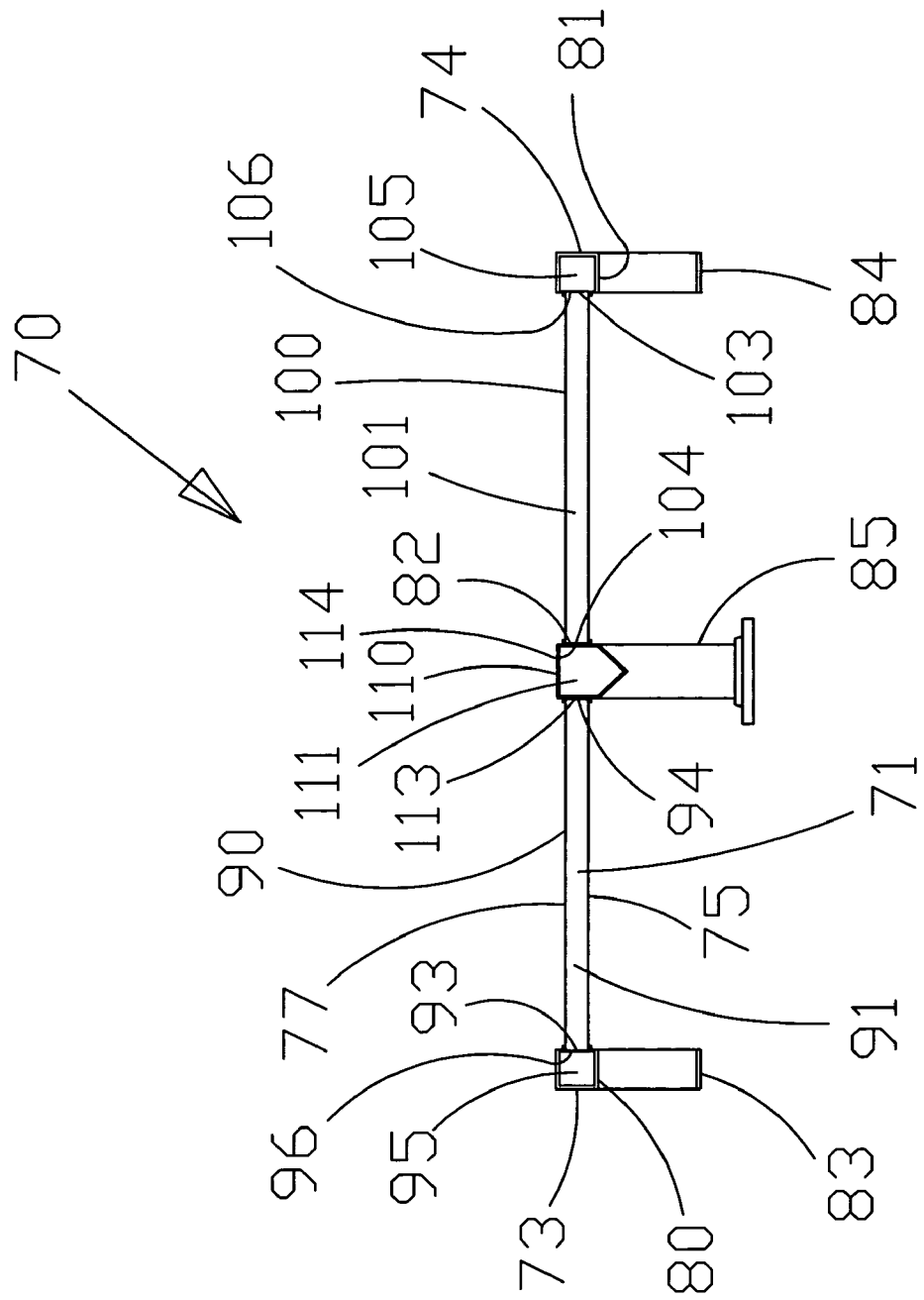
FIG. 9 is a top view of the preferred embodiment of the charge air cooler shown in FIG. 8.
Figure 10:
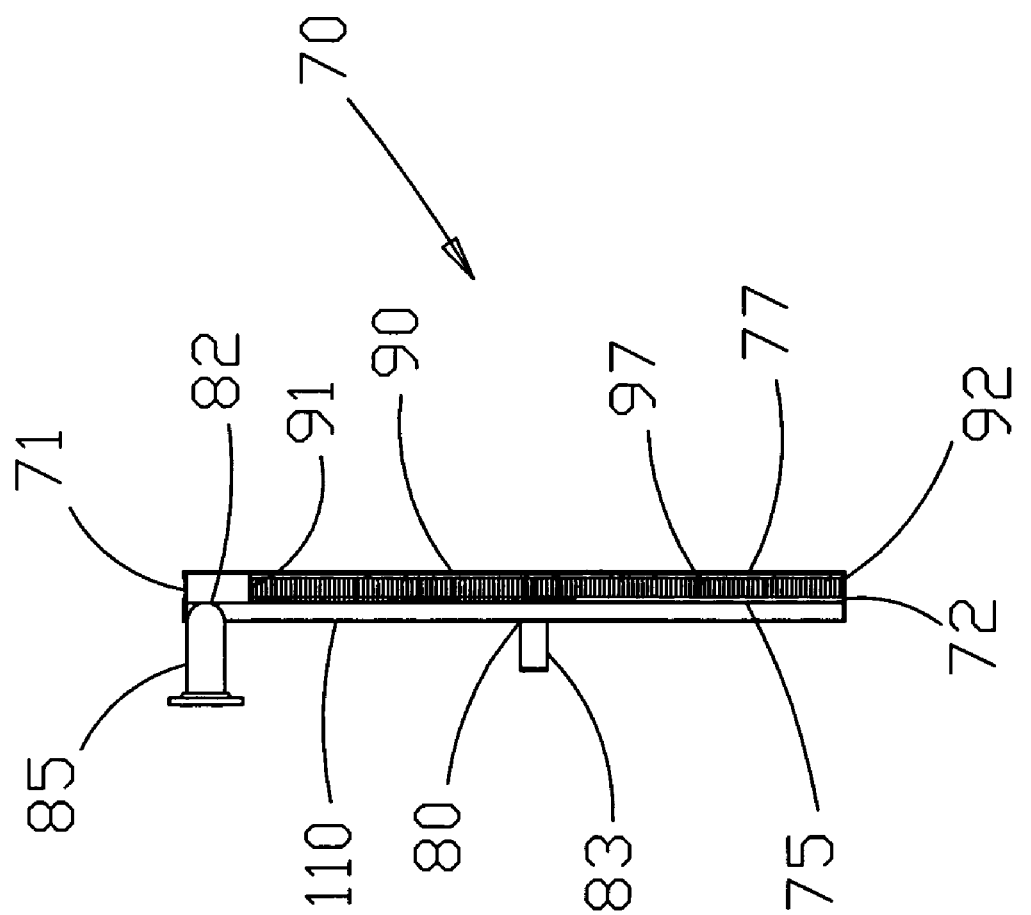
FIG. 10 is a side cross-sectional view taken along line 10-10 in FIG. 8.
Figure 11:
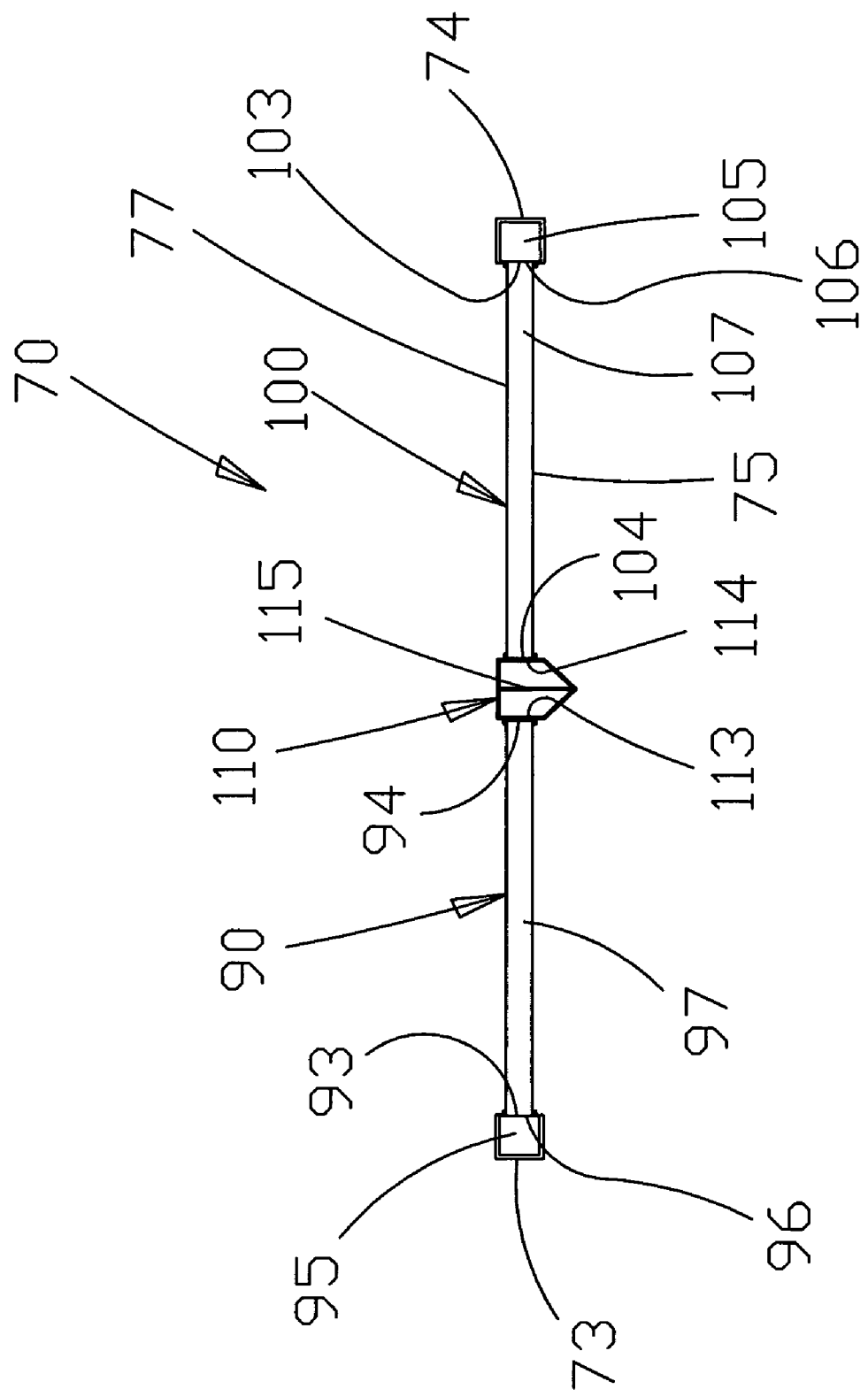
FIG. 11 is a top cross-sectional view taken along line 11-11 in FIG. 8.

Looking now at FIGS. 5-7, it is shown that a jacket water cooler 130 is provided for dissipating heat from the engine coolant fluid. This cooler 130 is preferably a liquid to air heat exchanger. It can be constructed of metal oval tubes and metal flat fins. The tubes can be aligned in a staggered pattern and can be multiple rows deeps. Coolant can flow into and out of the cooler 130 through metal or steel nozzles. It is understood that while the description heretofore represents preferred construction, other embodiments can be used without departing from the broad aspects of the present invention. The jacket water cooler 130 is preferably held in place by the frame 40 of the heat exchanger 30, and is located at the second end 42 of the heat exchanger. The jacket water cooler 130 has a top 131, a bottom 132, a first side 133, a second side 134 and a front 135. The front 135 of the jacket water cooler 130 preferably is planar and lies in plane 136. The front 135 is upstream of a back 137.

A pair of coolant inlets 140 and 141, respectively, is provided. The first inlet 140 is preferably located at the top 131 of the jacket water cooler 130 between the first side 133 and the center. The second inlet 141 is preferably also located at the top 131 of the jacket water cooler 130 between the second side 134 and the center. A coolant outlet 142 is further provided. The outlet 142 is preferably located at or near the bottom 132 of the jacket water cooler 130, and can be offset from the center of the bottom 132. A first inlet line 143 is provided. The inlet line 143 has a first end connected to coolant outlet 12 of the engine, and a second end connected to coolant inlet 140 of the jacket water cooler 130. A second inlet line 144 is also provided. Inlet line 144 has a first end connected to coolant outlet 13 of the engine 10, and a second end collected to coolant inlet 141 of the jacket water cooler 130. An outlet line, or return pipe, 145 is further provided. The outlet line 145 has a first end connected to the coolant inlet 11 of the engine 10, and a second end connected to the coolant outlet 142 of the jacket water cooler 130. It is appreciated that, as shown in FIG. 1, the jacket water cooler 130, the inlet lines 143 and 144 and the outlet line 145 comprise a jacket water cooling circuit 146. The jacket water cooling circuit 146 is a distinct and independent internal cooling circuit.

Looking again at FIG. 5, it is seen that the jacket water cooler 130 is downstream of the charge air cooler 70. Maximum entering temperature differential in the charge air cooler 70 occurs at the sides 73 and 74 of the cooler 70, respectively, as does maximum heat energy transfer. The air passing through the middle of the charge air cooler 70 (adjacent the vertical center tank 110) gains the least amount of heat energy as the entering temperature differential between the ambient air and the charge air is the smallest. The temperature profile of the air as it passes between the charge air cooler 70 and enters the jacket water cooler 130 is warmest at the sides 133 and 134 of the jacket water cooler. The air passing through the jacket water cooler 130 in the center of the cooler is relatively cool (when compared to the temperature of the air at the sides 133 and 134 of the cooler). The jacket water cooler 130 gains efficiency in the zone where the passing air is relatively cool of the jacket water cooler 130, as the entering temperature differential in increased.

It is further shown in FIG. 5 that the charge air cooler 70 is wider than the jacket water cooler 130, and that the jacket water cooler 130 is taller than the charge air cooler 70. Such geometrical arrangement results in a larger zone in the jacket water cooler 130 operating at a favorable entering temperature differential. The fan is accordingly situated to move air through the heart of the heat exchanger 30.

In series, the charge air cooler and the jacket water cooler utilized different zones for increased energy transfer and overall heat exchanger efficiency. The system resistance normally associated with fully stacked systems is decreased by the present invention, and heat and pressure gain of the air passing through the heat exchanger is more evenly dispersed. Accordingly, the driving potential of the air mover is increased, and requires less horsepower.

Thus it is apparent that there has been provided, in accordance with the invention, a heat exchanger that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A charge air cooler for cooling charge air from a first turbocharger and a second turbocharger, said charge air cooler comprising:

a top, a bottom, a first side and a second side;

a center tank vertically oriented between said top and said bottom, said center tank being between said first side and said second side;

a first section comprising a first section tank and being bound by said top, said bottom, said first side and said center tank, wherein charge air from the first turbocharger enters said first section tank and flows horizontally to said vertical center tank; and a second section comprising a second section tank and being bound by said top, said bottom, said second side and said center tank, wherein charge air from the second turbocharger enters said second section tank and flows horizontally to said vertical center tank.

2. The charge air cooler of claim 1 wherein:

said first section tank is at said first side of said charger air cooler, said first section tank having a first section charge air inlet between said top and said bottom of said charge air cooler;

said second section tank is at said second side of said charge air cooler, said second section tank having a second section charge air inlet between said top and said bottom of said charge air cooler;

said first section comprises a first section header and a plurality of first section horizontal tubes between said first section header and said center tank; and said second section comprises a plurality of second section horizontal tubes between said second section header and said center tank.

3. The charge air cooler of claim 2 wherein:

said center tank comprises a center tank top, a center tank bottom, a center tank first side, a center tank second side, and an inner wall vertically between said center tank bottom and said center tank top;

charge air cooled in said first section passes into said center tank along said center tank first side and rises to said center tank top;

charge air cooled in said second section passes into said center tank along said center tank second side and rises to said center tank top; and any condensate formed through the process of cooling the charge air falls to the bottom of said center tank and the cooled charge air exits at the top of said center tank.

4. A charge air cooler for cooling charge air from a first turbocharger and a second turbocharger, said charge air cooler comprising:

a top, a bottom, a first side and a second side, said first side and said second side defining a core width therebetween;

a center tank that is vertically oriented between said top and said bottom, is between said first side and said second side and receiving cooled charge air passing from a first section and a second section;

said first section bound by said top, said bottom, said first side and said center tank and comprising a plurality of first section tubes being oriented generally horizontally and connected to said center tank, said first section tubes each having a first section tube length and the charge air from the first turbocharger flows through said plurality of first section tubes and into said center tank; and said second section bound by said top, said bottom, said second side and said center tank and comprising a plurality of second section tubes being oriented generally horizontally and connected to said center tank, said second section tubes each having a second section tube length and the charge air from the second turbocharger flows through said plurality of second section tubes and into said center tank, wherein the sum length of said first section tube length and said second section tube length is less than or equal to said core width.

5. The charge air cooler of claim 4 wherein:

said first section comprises a first section tank and a first section header at said first side of said charger air cooler, said plurality of first section tubes being connected to said first section header and said center tank;

said first section tank has a first section charge air inlet receiving charge air from the first turbocharger, said first section charge air inlet being located between said bottom and said top of said charge air cooler;

said second section comprises a second section tank and a second section header at said second side of said charge air cooler, said plurality of second section tubes being connected to said second section header and said center tank; and said second section tank has a second section charge air inlet receiving charge air from the second turbocharger, said second section charge air inlet being located between said bottom and said top of said charge air cooler.

6. The charge air cooler of claim 4 wherein:

said center tank comprises a center tank top, a center tank bottom, a center tank first side, a center tank second side, and an inner wall vertically between said center tank bottom and said center tank top;

charge air cooled in said first section passes into said center tank along said center tank first side and rises to said center tank top;

charge air cooled in said second section passes into said center tank along said center tank second side and rises to said center tank top; and any condensate formed through the process of cooling the charge air falls to the bottom of said center tank and the cooled charge air exits at the top of said center tank.

7. A charge air cooler for cooling charge air from a first turbocharger and a second turbocharger, said charge air cooler comprising:

a top, a bottom, a first side and a second side;

a center tank receiving cooled charge air passing from a first section and a second section, said center tank having a single outlet for sending cooled charge air to the engine; said center tank orientated between said top and said bottom, and said tank is between said first side and said second side;

said first section comprising a first section tank having a first section inlet for receiving charge air from the first turbocharger, and further comprising a first section header, charge air from the first turbocharger moving through said first section in a first direction to said center tank; and said second section comprising a second section tank having a second section inlet for receiving charge air from the second turbocharger, and further comprising a second section header charge air from the second turbocharger moving through said second section in a second direction that is generally opposed to said first direction to said center tank, whereby said first section header is subject to stress caused by the first turbocharger and said second section header is subject to stress caused by the second turbocharger.

8. The charge air cooler of claim 7 wherein:

said center tank is vertically oriented between said top and said bottom, said center tank being between said first side and said second side;

said first section is bound by said top, said bottom, said first side and said center tank, said first section further comprises a plurality of first section tubes being oriented generally horizontally, and the charge air from the first turbocharger flows from said first section header through said plurality of first section tubes and into said center tank; and said second section is bound by said top, said bottom, said second side and said center tank, said second section further comprises a plurality of second section tubes being oriented generally horizontally, and the charge air from the second turbocharger flows from said second section header through said plurality of second section tubes and into said center tank.

9. The charge air cooler of claim 8 wherein:
said first section charge air inlet is located between said bottom and said top of said charge air cooler; and
said second section charge air inlet is located between said bottom and said top of said charge air cooler.

10. The charge air cooler of claim 8 wherein:
said center tank comprises a center tank top, a center tank bottom, a center tank first side, a center tank second side, and an inner wall vertically between said center tank bottom and said center tank top;
charge air cooled in said first section passes into said center tank along said center tank first side and rises to said center tank top;
charge air cooled in said second section passes into said center tank along said center tank second side and rises to said center tank top; and
any condensate formed through the process of cooling the charge air falls to the bottom of said center tank and the cooled charge air exits at the top of said center tank.

11. An apparatus comprising:
an engine having a charge air inlet;
a first turbocharger having a first turbocharger charge air outlet;
a second turbocharger having a second turbocharger charge air outlet;
a heat exchanger assembly comprising a charge air cooler, said charge air cooler comprising:
    a first side, a second side, a top and a bottom;
    a vertically oriented center tank having a charge air outlet;
    a first section bound by said first side, said top, said bottom and said center tank and having a first section charge air inlet;
    a second section bound by said second side, said top, said bottom and said center tank and having a second section charge air inlet;
a first inlet line connected to said first turbocharger charge air outlet and to said first section charge air inlet;
a second inlet line connected to said second turbocharger charge air outlet and to said second section charge air inlet; and
a return line connected to said charge air outlet of said center tank and to said charge air inlet of said engine.

12. The apparatus of claim 11 wherein:
said first section of said charge air cooler comprises a first section tank at said first side of said charge air cooler and a plurality of first section horizontal tubes between said first section tank and said vertically oriented center tank, said first charge air inlet being connected to said first section tank approximately ½ way between said top and said bottom of said charge air cooler; and
said second section of said charge air cooler comprises a second section tank at said second side of said charge air cooler and a plurality of second section horizontal tubes between said second section tank and said vertically oriented center tank, said second charge air inlet being connected to said second section tank approximately ½ way between said top and said bottom of said charge air cooler.

13. The apparatus of claim 12 wherein:
said vertically oriented center tank comprises a center tank top, a center tank bottom, a center tank first side, a center tank second side, and an inner wall vertically between said center tank bottom and said center tank top;
charge air cooled in said first section passes into said center tank along said center tank first side and rises to said center tank top;
charge air cooled in said second section passes into said center tank along said center tank second side and rises to said center tank top; and
any condensate formed through the process of cooling the charge air falls to the bottom of said center tank and the cooled charge air exits at the top of said center tank.

14. The apparatus of claim 12 further comprising:
an air mover for moving air in an axial direction; and
a jacket water cooler located downstream of said charge air cooler, said jacket water cooler having a selected amount of engine coolant flow vertically there through, wherein:
said air mover moves air at the ambient temperature through said charge air cooler, the air gaining heat energy as it passes there through whereby the air adjacent said first side and said second side of said heat exchanger assembly experiences the highest rise in temperature and the air between the first side and the second side of said heat exchanger assembly experiences the least rise in temperature as the air passes through said charge air cooler; and
said air passes next through said jacket water cooler, the air being between said first side and said second side of said heat exchanger assembly having the greatest temperature differential compared to the temperature of the selected amount of engine coolant whereby the jacket water cooler has increased efficiency due to the increased entering temperature differential.

15. A heat exchanger comprising:
an air mover moving air in an axial direction;
a charge air cooler comprising:
    a charge air cooler first side, a charge air cooler second side, a charge air cooler top and a charge air cooler bottom;
    a vertically oriented charge air cooler center tank;
    a first section bound by said charge air cooler first side, said charge air cooler top, said charge air cooler bottom and said charge air cooler center tank; and
    a second section bound by said charge air cooler second side, said charge air cooler top, said charge air cooler bottom and said charge air cooler center tank,
    wherein air passing through said charge air cooler gains the most heat energy at said charge air cooler first side and said charge air cooler second side and the least heat energy in the area bounded by the charge air cooler top and the charge air cooler bottom and between the charge air cooler first side and the charge air cooler second side; and
a jacket water cooler downstream of said charge air cooler, and comprising a jacket water cooler first side, a jacket water cooler second side, a jacket water cooler middle between said jacket water cooler first side and said jacket water cooler second side, a jacket water cooler top and a jacket water cooler bottom, said jacket water cooler being a vertical flow jacket water cooler, wherein said jacket water cooler middle adjacent said jacket water cooler top experiences the greatest temperature differential between engine coolant and the air that has previously passed through said charge air cooler.

16. The heat exchanger of claim 15 wherein:

said first section of said charge air cooler comprises a first section tank at said charge air cooler first side and a plurality of first section horizontal tubes between said first section tank and said vertically oriented charge air cooler center tank, said first charge air inlet being connected to said first section tank approximately ½ way between said charge air cooler top and said charge air cooler bottom; and said second section of said charge air cooler comprises a second section tank at said charge air cooler second side and a plurality of second section horizontal tubes between said second section tank and said vertically oriented charge air cooler center tank, said second charge air inlet being connected to said second section tank approximately ½ way between said charge air cooler top and said charge air cooler bottom.

17. The apparatus of claim 16 wherein:

said vertically oriented charge air cooler center tank comprises a center tank top, a center tank bottom, a center tank first side, a center tank second side, and an inner wall vertically between said center tank bottom and said center tank top;

charge air cooled in said first section passes into said charge air cooler center tank along said center tank first side and rises to said center tank top;

charge air cooled in said second section passes into said charge air cooler center tank along said center tank second side and rises to said center tank top; and any condensate formed through the process of cooling the charge air falls to the bottom of said center tank and the cooled charge air exits at the top of said center tank.

18. The heat exchanger of claim 15 wherein said air mover is a fan, said fan pushing air through said heat exchanger.

* * * * *